US012342960B1

(12) United States Patent
Johnson et al.

(10) Patent No.: US 12,342,960 B1
(45) Date of Patent: Jul. 1, 2025

(54) GRILL FEED AND BURN SYSTEM

(71) Applicant: Dansons US, LLC, Scottsdale, AZ (US)

(72) Inventors: Justin Johnson, Gilbert, AZ (US); Christopher James, Phoenix, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 0 days.

(21) Appl. No.: 18/586,487

(22) Filed: Feb. 25, 2024

Related U.S. Application Data

(60) Provisional application No. 63/458,388, filed on Apr. 10, 2023.

(51) Int. Cl.
*A47J 37/07* (2006.01)

(52) U.S. Cl.
CPC ....... *A47J 37/0786* (2013.01); *A47J 37/0704* (2013.01)

(58) Field of Classification Search
CPC .......................... A47J 37/0786; A47J 37/0704
See application file for complete search history.

(56) References Cited

U.S. PATENT DOCUMENTS

| | | | |
|---|---|---|---|
| 2,068,018 A | 1/1937 | Goetz | |
| 2,910,930 A | 11/1959 | Hankoff | |
| 3,017,954 A | 1/1962 | Kruckewitt | |
| 3,342,355 A * | 9/1967 | Lasiter | B65G 65/46 |
| | | | 414/526 |
| 3,606,066 A | 9/1971 | Anderson | |
| 3,623,422 A | 11/1971 | Marshall | |
| 4,300,456 A | 11/1981 | Messersmith | |
| 4,593,629 A | 6/1986 | Pedersen et al. | |
| 4,779,544 A | 10/1988 | Stevens | |
| 4,810,510 A | 3/1989 | Lever et al. | |
| 4,823,684 A | 4/1989 | Traeger et al. | |
| 4,856,438 A | 8/1989 | Peugh | |
| 4,909,235 A | 3/1990 | Boetcker | |
| 4,966,126 A | 10/1990 | Wu | |
| 5,123,360 A * | 6/1992 | Burke | F24B 1/024 |
| | | | 126/61 |
| 5,197,379 A | 3/1993 | Leonard, Jr. | |
| 5,251,607 A | 10/1993 | Traeger et al. | |
| 5,375,540 A | 12/1994 | Verrecchia et al. | |
| 5,423,430 A | 6/1995 | Zaffiro et al. | |
| 5,429,110 A | 7/1995 | Burke et al. | |

(Continued)

FOREIGN PATENT DOCUMENTS

| | | |
|---|---|---|
| AT | 402850 B | 1/1997 |
| CH | 688303 | 7/1997 |

(Continued)

*Primary Examiner* — Michael G Hoang
*Assistant Examiner* — Logan P Jones
(74) *Attorney, Agent, or Firm* — Thomas W. Galvani, P.C.; Thomas W. Galvani

(57) ABSTRACT

In an embodiment, a cooking appliance for cooking with a fuel includes a hopper configured to hold the fuel and a burn pot configured to receive the fuel and hold the fuel during combustion thereof. A feed tube extends from an upstream end, proximate the hopper, to a downstream end, proximate the burn pot, wherein the feed tube is configured to move the fuel from the upstream end to the downstream end. The upstream end of the feed tube is lower than the downstream end of the feed tube.

20 Claims, 11 Drawing Sheets

(56) References Cited

U.S. PATENT DOCUMENTS

| | | | |
|---|---|---|---|
| 5,490,452 A | 2/1996 | Schlosser et al. | |
| 5,809,991 A | 9/1998 | Pai | |
| 5,941,234 A | 8/1999 | Norburn et al. | |
| 6,039,039 A | 3/2000 | Pina, Jr. | |
| 6,187,359 B1 | 2/2001 | Zuccarini | |
| 6,209,533 B1 | 4/2001 | Ganard | |
| 6,223,737 B1 | 5/2001 | Buckner | |
| 6,293,271 B1 | 9/2001 | Barbour | |
| 6,314,955 B1 | 11/2001 | Boetcker | |
| 6,336,449 B1 * | 1/2002 | Drisdelle | F23B 90/06 |
| | | | 110/165 R |
| 7,360,639 B2 | 4/2008 | Sprouse et al. | |
| 7,530,351 B2 | 5/2009 | Leverty | |
| 7,624,675 B2 | 12/2009 | Galdamez | |
| D623,013 S | 9/2010 | Alden et al. | |
| 7,900,553 B1 * | 3/2011 | Maurin | F23B 50/12 |
| | | | 126/41 R |
| 7,984,709 B1 | 7/2011 | Byrnes et al. | |
| 8,006,686 B2 | 8/2011 | Hunt et al. | |
| 8,267,078 B2 | 9/2012 | Kuntz | |
| D681,394 S | 5/2013 | Parel et al. | |
| 8,651,018 B1 | 2/2014 | Loud, III | |
| 8,899,145 B2 | 12/2014 | Harrison et al. | |
| 8,985,092 B2 | 3/2015 | Ahmed | |
| D760,539 S | 7/2016 | Colston | |
| 9,427,108 B2 | 8/2016 | Ahmed | |
| 9,441,838 B2 | 9/2016 | Baker | |
| 9,585,518 B1 | 3/2017 | Phillips | |
| 9,635,978 B2 | 5/2017 | Measom et al. | |
| 9,759,429 B2 | 9/2017 | Tucker | |
| 9,814,354 B2 | 11/2017 | McAdams et al. | |
| 9,913,559 B2 | 3/2018 | Polter et al. | |
| D817,091 S | 5/2018 | Colston | |
| 10,077,904 B2 | 9/2018 | Grant | |
| 10,201,247 B1 | 2/2019 | Jones | |
| 10,292,531 B1 | 5/2019 | Hancock et al. | |
| 10,495,317 B1 | 12/2019 | Hancock et al. | |
| D871,821 S | 1/2020 | Boltz et al. | |
| D901,244 S | 11/2020 | Baker et al. | |
| D907,424 S | 1/2021 | Measom et al. | |
| D915,138 S | 4/2021 | Bennion et al. | |
| D921,413 S | 6/2021 | Fitzpatrick | |
| D927,917 S | 8/2021 | Yueh | |
| D935,840 S | 11/2021 | Carter et al. | |
| 11,166,590 B2 | 11/2021 | Zheng | |
| 11,181,276 B2 | 11/2021 | Colston et al. | |
| 11,181,277 B2 | 11/2021 | Donnelly et al. | |
| 11,206,948 B2 | 12/2021 | Measom et al. | |
| 11,231,178 B2 | 1/2022 | James | |
| D945,208 S | 3/2022 | Duan et al. | |
| 11,359,817 B2 | 6/2022 | Donnelly et al. | |
| 11,445,857 B2 | 9/2022 | James et al. | |
| 2001/0017131 A1 | 8/2001 | Sim | |
| 2004/0226550 A1 | 11/2004 | Hutton et al. | |
| 2004/0255926 A1 | 12/2004 | Waits et al. | |
| 2005/0126556 A1 | 6/2005 | Bossler | |
| 2007/0181214 A1 * | 8/2007 | Kulas | A47J 43/0727 |
| | | | 141/247 |
| 2007/0204845 A1 * | 9/2007 | Pleau | F23B 60/02 |
| | | | 126/77 |
| 2008/0085172 A1 | 4/2008 | Harman et al. | |
| 2008/0098906 A1 | 5/2008 | Davis | |
| 2008/0230044 A1 | 9/2008 | Warner | |
| 2009/0013985 A1 | 1/2009 | Little et al. | |
| 2009/0056695 A1 | 3/2009 | Cosgrove | |
| 2009/0293860 A1 | 12/2009 | Carlson | |
| 2010/0218754 A1 | 9/2010 | Kuntz | |
| 2011/0073101 A1 | 3/2011 | Lau et al. | |
| 2011/0136066 A1 | 6/2011 | Geselle et al. | |
| 2011/0275023 A1 | 11/2011 | Knight | |
| 2012/0060699 A1 * | 3/2012 | Shidler | A47J 37/07 |
| | | | 99/341 |
| 2013/0160757 A1 | 6/2013 | Atemboski et al. | |
| 2013/0298894 A1 | 11/2013 | Kleinsasser | |
| 2013/0327259 A1 | 12/2013 | Freeman | |
| 2014/0261005 A1 | 9/2014 | Karau | |
| 2014/0326232 A1 | 11/2014 | Traeger | |
| 2014/0326233 A1 | 11/2014 | Traeger | |
| 2014/0373827 A1 | 12/2014 | Zhu et al. | |
| 2014/0377431 A1 | 12/2014 | Kazerouni | |
| 2015/0079250 A1 | 3/2015 | Ahmed | |
| 2015/0081086 A1 | 3/2015 | Hallowell et al. | |
| 2015/0136109 A1 | 5/2015 | Baker | |
| 2015/0182074 A1 | 7/2015 | Bucher et al. | |
| 2015/0265099 A1 | 9/2015 | Coffie | |
| 2015/0320259 A1 | 11/2015 | Tucker | |
| 2016/0174767 A1 | 6/2016 | Schlosser et al. | |
| 2016/0245529 A1 | 8/2016 | McClean | |
| 2016/0255999 A1 | 9/2016 | McAdams et al. | |
| 2016/0327263 A1 | 11/2016 | Traeger | |
| 2016/0341423 A1 | 11/2016 | Johnson | |
| 2016/0353706 A1 | 12/2016 | Gallagher et al. | |
| 2017/0065124 A1 | 3/2017 | Colston | |
| 2017/0067649 A1 | 3/2017 | Colston | |
| 2017/0102149 A1 | 4/2017 | Nadal | |
| 2017/0164783 A1 * | 6/2017 | Sauerwein | A47J 37/0786 |
| 2017/0196400 A1 | 7/2017 | Colston | |
| 2017/0198917 A1 | 7/2017 | Gillespie et al. | |
| 2017/0219213 A1 | 8/2017 | Measom et al. | |
| 2017/0289257 A1 | 10/2017 | Colston | |
| 2017/0343218 A1 | 11/2017 | Tucker | |
| 2017/0370592 A1 | 12/2017 | Bogazzi | |
| 2018/0028018 A1 | 2/2018 | Barnett et al. | |
| 2018/0031246 A1 | 2/2018 | Barford | |
| 2018/0168397 A1 | 6/2018 | Colston | |
| 2018/0192822 A1 | 7/2018 | Cedar et al. | |
| 2018/0213970 A1 | 8/2018 | Colston | |
| 2018/0296031 A1 | 10/2018 | Terrell, Jr. et al. | |
| 2018/0317707 A1 | 11/2018 | Dahle | |
| 2018/0368617 A1 | 12/2018 | Allmendinger | |
| 2018/0368618 A1 | 12/2018 | Measom et al. | |
| 2019/0008321 A1 | 1/2019 | Allmendinger | |
| 2019/0282032 A1 | 9/2019 | Colston et al. | |
| 2019/0290064 A1 | 9/2019 | Colston et al. | |
| 2019/0290066 A1 | 9/2019 | Colston | |
| 2019/0293295 A1 | 9/2019 | Colston et al. | |
| 2019/0335774 A1 | 11/2019 | Garces et al. | |
| 2019/0335949 A1 | 11/2019 | Simon et al. | |
| 2019/0365152 A1 | 12/2019 | Dahle et al. | |
| 2019/0374065 A1 | 12/2019 | Hancock et al. | |
| 2019/0387924 A1 | 12/2019 | Zheng | |
| 2020/0086780 A1 | 3/2020 | Baker et al. | |
| 2020/0116349 A1 | 4/2020 | Rahmani et al. | |
| 2020/0158337 A1 | 5/2020 | Baker et al. | |
| 2020/0214304 A1 | 7/2020 | Garces et al. | |
| 2020/0214501 A1 | 7/2020 | Gafford et al. | |
| 2020/0221717 A1 | 7/2020 | Jackson | |
| 2020/0240643 A1 * | 7/2020 | Donnelly | F24B 15/005 |
| 2020/0333011 A1 | 10/2020 | Ahmed et al. | |
| 2020/0370752 A1 | 11/2020 | Ahmed et al. | |
| 2021/0052107 A1 * | 2/2021 | Pruitt | A47J 36/32 |
| 2021/0180793 A1 | 6/2021 | James | |
| 2021/0267413 A1 | 9/2021 | Roberts et al. | |
| 2021/0298333 A1 | 9/2021 | Strong et al. | |
| 2021/0341144 A1 * | 11/2021 | Parsons | F23B 1/38 |
| 2021/0352923 A1 | 11/2021 | Li et al. | |
| 2021/0356130 A1 | 11/2021 | Li | |
| 2021/0361115 A1 | 11/2021 | Colston et al. | |
| 2022/0046937 A1 | 2/2022 | Simon et al. | |
| 2022/0082262 A1 | 3/2022 | Colston et al. | |
| 2023/0070954 A1 * | 3/2023 | Witzel | F24B 13/04 |

FOREIGN PATENT DOCUMENTS

| | | |
|---|---|---|
| CN | 201515960 U | 6/2010 |
| CN | 102345861 A | 2/2012 |
| CN | 203549790 U | 4/2014 |
| CN | 103989414 A | 8/2014 |
| CN | 105263378 A | 5/2018 |
| DE | 102009014010 A1 | 10/2010 |
| EP | 4026624 A1 | 7/2022 |
| FR | 713315 | 10/1931 |
| KR | 100752761 B1 | 8/2007 |

(56) References Cited

FOREIGN PATENT DOCUMENTS

| | | | | |
|---|---|---|---|---|
| KR | 100821465 | B1 | 4/2008 | |
| KR | 20090119121 | A | 11/2009 | |
| SE | 518842 | C2 * | 11/2002 | ............. F23B 50/12 |
| WO | WO-2013116946 | A1 * | 8/2013 | ......... A47J 37/0704 |
| WO | 2017044598 | A1 | 3/2017 | |
| WO | 2017064528 | A1 | 4/2017 | |
| WO | 2018111155 | A1 | 6/2018 | |
| WO | 2018125681 | A1 | 7/2018 | |
| WO | 2018208919 | A1 | 11/2018 | |
| WO | 2020077364 | A1 | 4/2020 | |
| WO | 2020176883 | A1 | 9/2020 | |
| WO | 2020243699 | A1 | 12/2020 | |
| WO | 2021174202 | A1 | 9/2021 | |
| WO | 2023044122 | A1 | 3/2023 | |

* cited by examiner

GRILL FEED AND BURN SYSTEM

CROSS-REFERENCE TO RELATED APPLICATIONS

This application claims the benefit of U.S. Provisional Application No. 63/458,388, filed Apr. 10, 2023, which is hereby incorporated by reference in its entirety.

FIELD

The present specification relates generally to cooking appliances, and more particularly to grills and smokers.

BACKGROUND

Cooking appliances such as grills, smokers, and the like are enormously popular for cooking meats, vegetables, and other types of food. Typically, grills cook food at high temperatures in short amounts of time by heating or searing the food on a rack. Smokers usually cook food at lower temperatures for longer times and use smoke to imbue the food with rich flavors. Grilling or smoking food gives the food qualities that are difficult to replicate in more conventional indoor-type appliances.

There are many different types of grills and smokers, such as those that rely on charcoal, propane, or pellets as a fuel source. Pellet grills and smokers burn wood pellets to create heat and smoke with which food is cooked. As the pellets burn, they heat the grill or smoker and its interior space and fill it with smoke. Charcoal grills burn charcoal briquettes or lumps that create high temperatures within the grill. And propane ignites to produce a flame directly from a gas tube to heat the grill and its interior space.

The construction and operation of a grill or smoker will affect its cooking performance and its overall performance. Some grills or smokers are better at heating the entire cooking chamber evenly and consistently. Others have better smoke circulation within the cooking chamber. Some are easy to clean and maintain, and some are much safer than others. Moreover, different cooks have different operating, grilling, smoking, and cooking preferences. There is therefore a general continuing need to improve and produce different types of grills and smokers to adapt to different uses and users.

SUMMARY

In an embodiment, a cooking appliance for cooking with a fuel includes a hopper configured to hold the fuel and a burn pot configured to receive the fuel and hold the fuel during combustion thereof. A feed tube extends from an upstream end, proximate the hopper, to a downstream end, proximate the burn pot, wherein the feed tube is configured to move the fuel from the upstream end to the downstream end. The upstream end of the feed tube is lower than the downstream end of the feed tube.

In embodiments, the cooking appliance includes an auger mounted for rotation within the feed tube. A flap is hinged to the downstream end of the feed tube. A drain is at the upstream end of the feed tube, and a trap is mounted over the drain for movement between first and second positions. In the first position of the trap, the trap opens the drain to clear the fuel from the feed tube, and in the second position of the trap, the trap closes the drain. The burn pot is disposed lower than the downstream end of the feed tube. A slide extends between the downstream end of the feed tube and the burn pot for conveying the fuel ejected out of the downstream end into the burn pot. The slide is angled. A ramp is below the downstream end of the feed tube and includes a cantilevered body with a free end suspended into the burn pot. A fan is configured to draw air into the cooking appliance and direct it toward the burn pot. The fan is below the feed tube and rotates along a fan axis, and the feed tube extends along a feed axis which is parallel to the fan axis. A plenum is separated by the fan into first and second compartments, the feed tube extends through both the first and second compartments, the burn pot is disposed in the second compartment, and the fan draws air into the first compartment and moves the air into the second compartment.

In an embodiment of a cooking appliance for cooking with a fuel, the cooking appliance includes a hopper configured to hold the fuel, a burn pot configured to receive the fuel and hold the fuel during combustion thereof, and a feed tube configured to receive the fuel from the hopper at a first height, move the fuel from the hopper, and eject the fuel at a second height into the burn pot. The second height is greater than the first height.

In embodiments, an auger is mounted for rotation within the feed tube. A flap is hinged to a downstream end of the feed tube. S drain is in the feed tube, and a trap is mounted over the drain for movement between first and second positions. In the first position of the trap, the trap opens the drain to clear the fuel from the feed tube, and in the second position of the trap, the trap closes the drain. The burn pot is disposed lower than a downstream end of the feed tube above the burn pot. A slide extends between the feed tube and the burn pot for conveying the fuel ejected out of the feed tube into the burn pot. The slide is angled. A ramp is below the feed tube and includes a cantilevered body with a free end suspended into the burn pot. A fan is configured to draw air into the cooking appliance and direct it toward the burn pot. The fan is below the feed tube and rotates along a fan axis, and the feed tube extends along a feed axis which is parallel to the fan axis. A plenum is separated by the fan into first and second compartments. The feed tube extends through both the first and second compartments, the burn pot is disposed in the second compartment, and the fan draws air into the first compartment and moves the air into the second compartment.

In an embodiment, a cooking appliance includes a hopper configured to hold cooking fuel, a burn pot for receiving and holding the fuel during combustion thereof, and a feed tube extending diagonally from proximate to the hopper to proximate to the burn pot.

In an embodiment, a cooking appliance includes a hopper configured to hold the fuel. The hopper terminates in a throat defining a chute extending from the hopper to an outlet of the cooking appliance. A feed assembly is disposed in the throat and is configured to move fuel out of the throat. A drop assembly is arrangeable between first and second conditions, wherein the first condition of the drop assembly enables fuel in the feed assembly to drop out of the feed assembly, and the second condition of the drop assembly disables fuel in the feed assembly from dropping out of the feed assembly.

In embodiments, the first condition further enables fuel in the feed assembly to drop out of the outlet of the cooking appliance. The feed assembly includes an auger, and the drop assembly includes a trap below the auger which is mounted for movement between a first position and a second position. In the first position of the trap, the trap opens the throat below the auger, and in the second position of the trap, the trap closes the throat below the auger. The feed assembly includes a feed tube, in the first condition of the drop assembly, the drop assembly opens the throat around the feed tube, and in the second condition of the drop assembly, the drop assembly closes the throat around the feed tube. The feed assembly includes a feed tube and an auger, and in the first condition of the drop assembly, the drop assembly opens the throat around the feed tube and below the auger, and in the second condition of the drop assembly, the drop assembly closes the throat around the feed tube and below the auger. The feed assembly includes an auger mounted in a feed tube having a drain below the auger, and the drop assembly includes a trap below the auger and flanges flanking the feed tube. In the first condition of the drop assembly, the trap is out of registration with the drain to join the hopper in fluid communication with the throat through the auger, and openings in the flanges are disposed in the throat to join the hopper in fluid communication with the throat around the feed tube. In the second condition of the drop assembly, the trap registers with the drain to occlude the drain and separate the hopper from fluid communication with the throat through the auger, and the flanges are disposed in the throat to separate the hopper from fluid communication with the throat around the feed tube. The drop assembly is lower than the hopper. The drop assembly is located at an upstream end of the feed assembly. The drop assembly is located at a bottom end of the feed assembly.

In an embodiment of a cooking appliance for cooking with a fuel, the cooking appliance includes a hopper configured to hold the fuel, a burn pot configured to receive the fuel and hold the fuel during combustion thereof, a feed tube extending from the hopper to the burn pot and configured to move the fuel from the hopper to the burn pot, and a trap arrangeable between first and second positions, wherein in the first position, the trap opens an opening in the feed tube to clear the fuel in the feed tube, and in the second position, the trap closes the opening in the feed tube.

In embodiments, the cooking appliance further includes an outlet of the cooking appliance, wherein in the first position of the trap, the opening is joined in fluid communication with the outlet to enable the fuel to drop out of the cooking appliance. An auger is mounted for rotation in the feed tube, and in the first position of the trap, the trap opens the opening in the feed tube to clear the fuel through the auger. A throat is below the hopper, wherein the feed tube is within the throat, flanges flank the feed tube, and in the first position of the trap, the flanges open the throat around the feed tube, while in the second position of the trap, the flanges close the throat around the feed tube. The trap is lower than the hopper. The trap is lower than the burn pot. The trap is located at an upstream end of the feed tube. The trap is located at a bottom end of the feed tube.

In an embodiment, a cooking appliance for cooking with a fuel includes a hopper configured to hold the fuel, a burn pot configured to receive the fuel and hold the fuel during combustion thereof, a fuel pathway configured to move fuel from the hopper to the burn pot, and a trap disposed in the fuel pathway. The trap is arrangeable between first and second positions, wherein in the first position of the trap, the trap enables movement of the fuel along the fuel pathway, and in the second position, the trap enables dropping of the fuel out of the fuel pathway.

In embodiments, the trap is lower than the hopper. The trap is lower than the burn pot. The trap is located in a feed tube for carrying the fuel from the hopper to the burn pot. The trap is located at an upstream end of the feed tube. The trap is located at a bottom end of the feed tube. The fuel pathway includes a feed tube, and in the first position of the trap, the trap opens a drain in the feed tube, and in the second position of the trap, the trap closes the drain in the feed tube. The fuel pathway includes a throat below the hopper, and in the first position of the trap, the throat is open, and in the second position of the trap, the trap is closed. The fuel pathway includes a throat below the hopper and a feed tube disposed in the throat, and in the first position of the trap, the trap opens a drain in the feed tube and opens the throat around the feed tube, while in the second position of the trap, the trap closes the drain and closes the throat around the feed tube.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
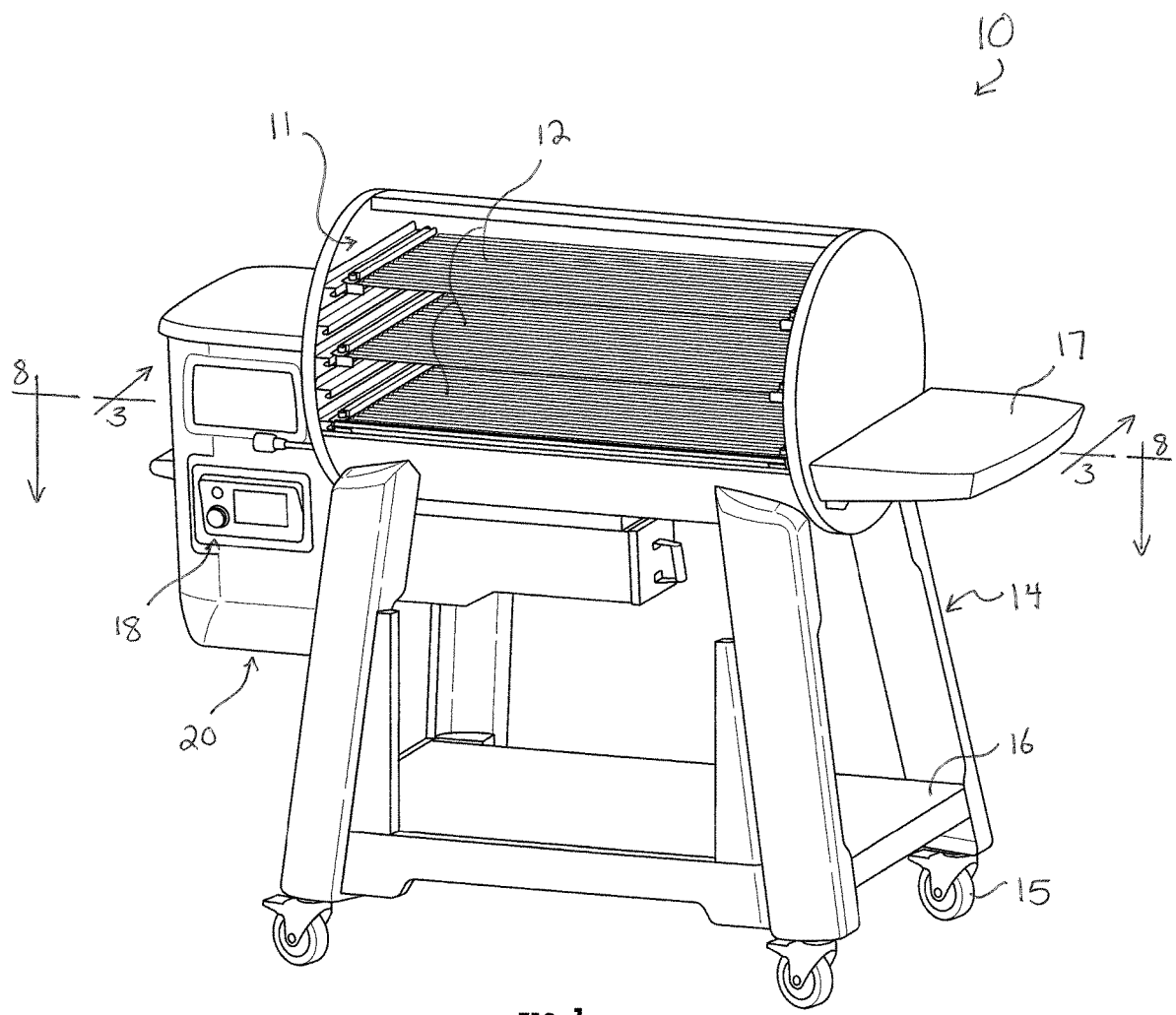
FIG. 1 is a top front perspective view of a grill equipped with a feed and burn assembly.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 2:
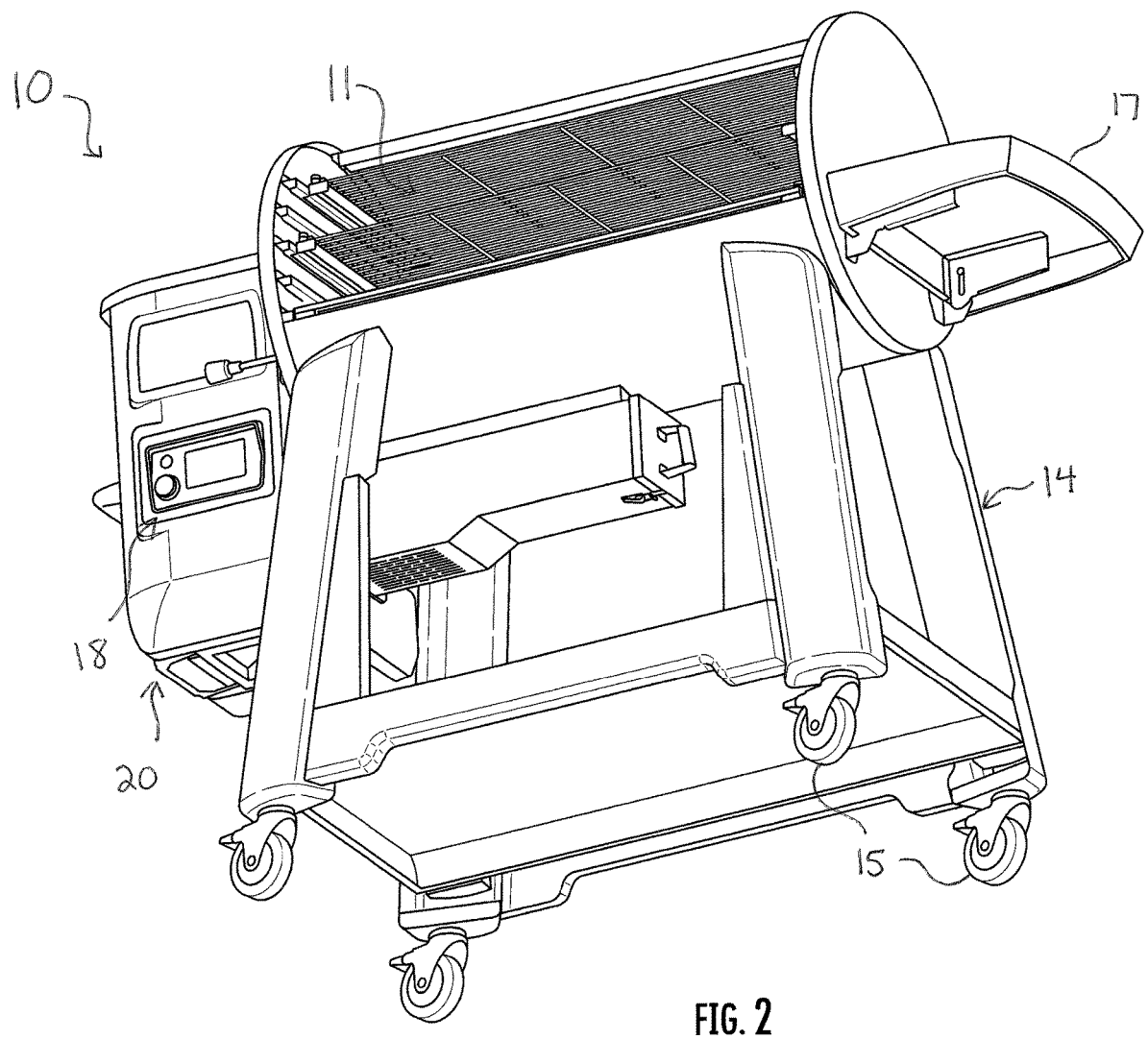
FIG. 2 is a bottom front perspective view of the grill of FIG. 1.

FIGS. 1 and 2 are front perspective views of a cooking appliance 10, such as a grill or smoker. For simplicity, this specification hereinafter refers to the cooking appliance 10 as a "grill 10." This is not meant to limit the scope of the disclosure, and indeed, the cooking appliance or grill 10 may include smokers, burners, wood stoves, griddles, outdoor heaters, or any other cooking appliance that uses heat to cook.

The grill 10 shown in the embodiment of the drawings includes a cooking chamber 11 fit with a removable cover or lid for closing the cooking chamber 11. The lid helps retain heat within the cooking chamber 11 for cooking food supported on racks 12 within the cooking chamber 11. In these drawings, the lid is hidden from view for clarity of the illustration; one having ordinary skill in the art will readily appreciate where the lid is located and how it operates.

A framework 14 supports the cooking chamber 11 at an elevated position for ease of use. Lockable wheels 15 carry the framework 14 for rolling movement, and shelves 16 and 17 attached to the framework 14 hold items for the user. The grill 10 includes a control unit and power supply 18 which powers and manages operation of the grill 10.

As noted above, the lid of the grill 10 is not shown in these drawings. Other portions of the appliance 10 are also removed or hidden in these drawings for clarity of the illustration. As another example, a shelf projecting form the cooking chamber 11 and an apron hanging from the cooking chamber 11 on the front of the framework 14 are not shown so that the structure behind can be seen.

A feed and burn assembly 20 or system is mounted both under and to the side of the cooking chamber 11. The feed and burn assembly 20 controls the rate at which the grill 10 burns fuel and thus controls much of the operation of the grill 10. The feed and burn assembly 20 is clearly visible in the section view of FIG. 3 (taken along the line 3-3 in FIG. 1) as well as in FIG. 4, which is an enlargement of a portion of FIG. 3, and in FIG. 5, which is a perspective section view of the enlarged portion of FIG. 4. The below description refers to these three drawings primarily.

The feed and burn assembly 20 includes at least a hopper 21, a feed assembly 22, a drop assembly 23, and a burn assembly 24. The hopper 21 holds and feeds fuel (hereinafter referred to as, but not limited to, "pellets" 25) into the feed assembly 22. Some pellets 25 are shown held in the hopper 21 in FIG. 3. The feed assembly 22 moves the pellets 25 to the burn assembly 24, where the pellets 25 are held during combustion. The pellets 25 move from, in, through, and to the various structures and features along a fuel movement pathway, or more simply, "a fuel pathway," indicated in FIG. 3 with arrowed lines marked by reference character 26. Generally, this specification refers to "upstream" and "downstream" movement or locations; the terms are used relative to movement of the pellets along the fuel pathway 26 from an upstream position (more toward the hopper 21) to a downstream position (more toward the burn assembly 24). The drop assembly 23 is arrangeable to selectively drop pellets, dust, and other debris or unwanted items from the feed and burn assembly 20 to clear them from the fuel pathway 26 and from the grill 10.

Figure 4:
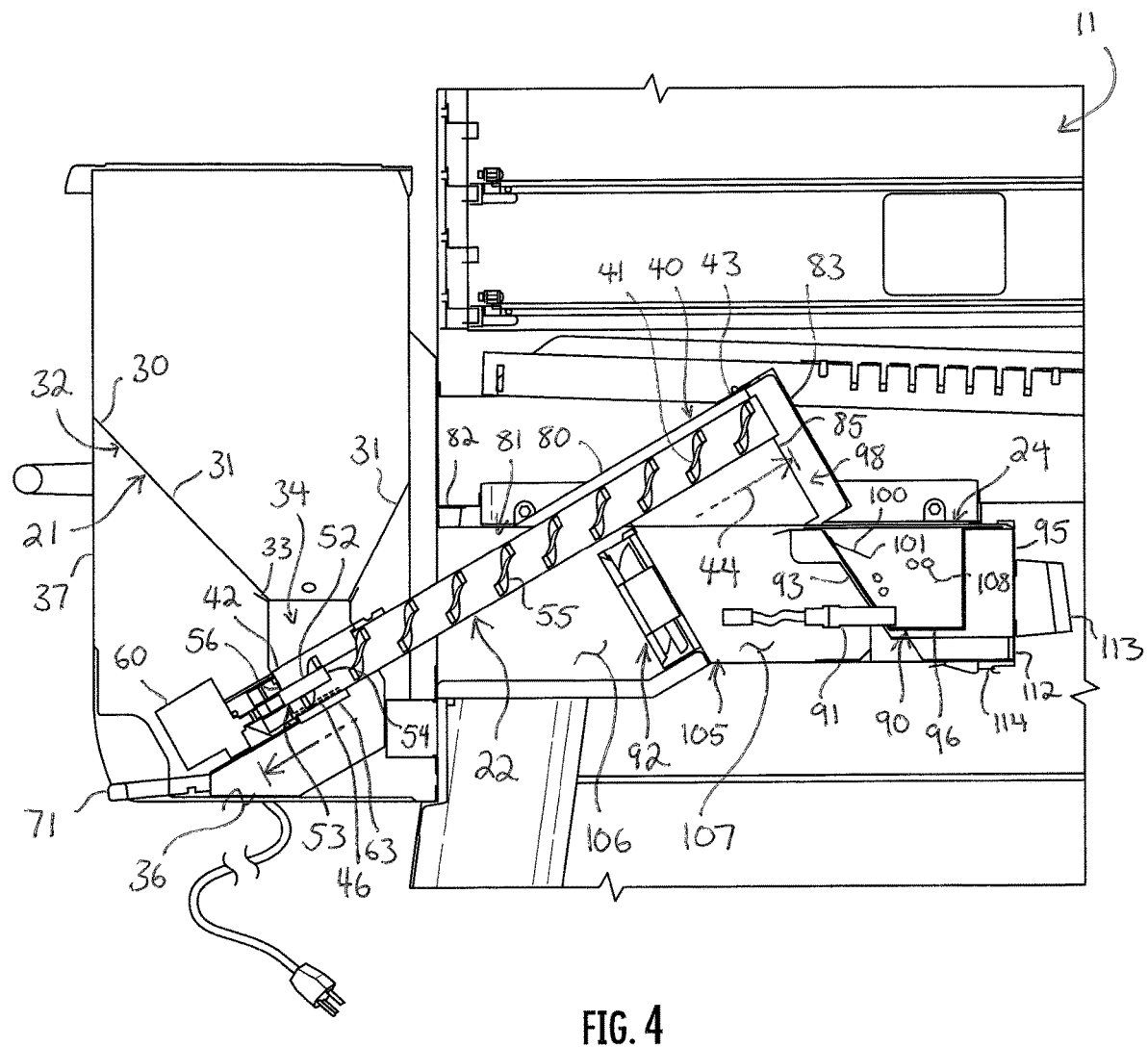
FIG. 4 is an enlarged section view of the grill taken along the line 1-1 in FIG. 1.
Figure 5:
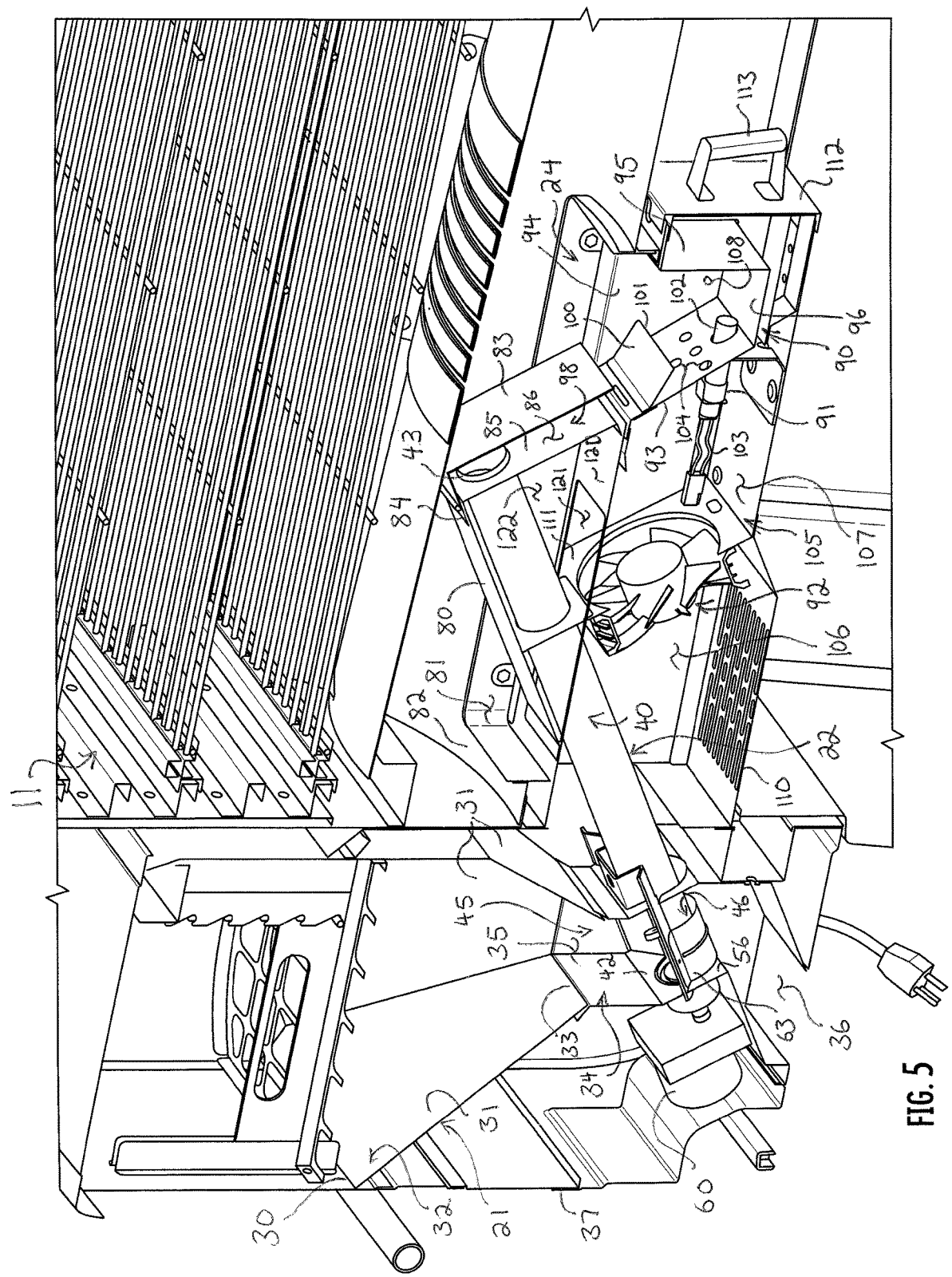
FIG. 5 is an enlarged perspective section view of the grill taken along a line parallel to and just slightly offset from the line 1-1 of FIG. 1.

FIGS. 4 and 5 illustrate the hopper 21. The hopper 21 is part of the fuel pathway 26, and the fuel pathway 26 moves the pellets 25 from the hopper 21. The hopper 21 has a roughly inverted, truncated, pyramid shape. At its top, the hopper 21 has a wide mouth 30. Four sides 31 cooperate to define a continuous sidewall 32 of the hopper 21 (one of the sides 31 cannot be seen in the section views of FIGS. 4 and 5). The four sides 31 extend downward, tapering inward toward each other to a neck 33 located at the bottom of the hopper 21. The neck 33 is reduced in lateral dimension compared to the mouth 30. The neck 33 defines the transition from the hopper 21 to a throat 34 below the hopper 21.

The throat 34 is a chute or passageway through the feed and burn assembly 20. The throat 34 is defined by four sides 35 cooperating to form a continuous sidewall which snakes through the grill 10 from the hopper 21 to an outlet 36 at the bottom of the grill 10. The hopper 21 is fit in snug contact with the throat 34, which has flanges that surround the bottom of the hopper 21. In other embodiments, the hopper 21 is in abutting contact with the throat 34. The hopper 21 and throat 34 define a single, continuous channel for pellets 25 to flow through freely under the force of gravity. Indeed, preferably, if not interrupted, blocked, or otherwise stopped, the pellets 25 will fall from the hopper 21, through the throat 34, and out the outlet 36 to clear the grill 10 of its pellets 25.

Figure 3:
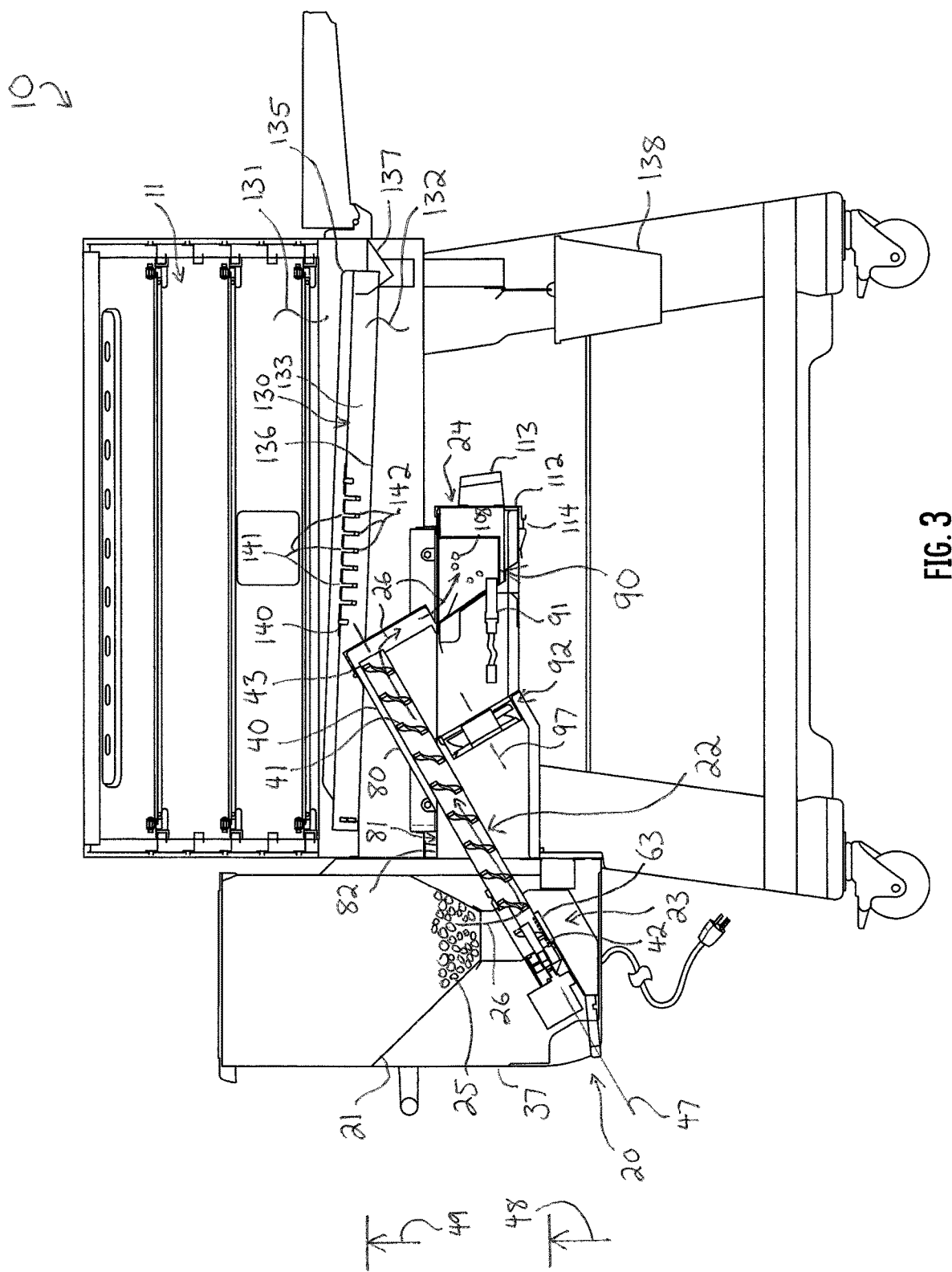
FIG. 3 is a section view of the grill taken along a line 1-1 in FIG. 1.

The feed assembly 22 is disposed in and interrupts the throat 34, however. The feed assembly 22 includes a feed tube 40 and an auger 41 mounted within the feed tube 40 for rotation, so as to move pellets 25 out of the throat 34. The feed assembly 22—and components thereof—is part of the fuel pathway 26. Both the feed tube 40 and the auger 41 extend along an axis 47 (shown only in FIG. 3). The feed tube 40 has a first, bottom, or upstream end 42 proximate the hopper 21 and an opposed second, top, or downstream end 43 spaced apart by the length 44 of the feed tube 40. The downstream end 43 is above, or higher than, the upstream end 42 in this embodiment of the grill 10; as seen in FIG. 3, the upstream end 42 is at a first height 48, and the downstream end 43 is at a second height 49 which is above or greater than the first height 48. The feed tube 40 is substantially cylindrical along its entire length 44 but for a portion proximate the upstream end 42. There, the sidewall of the feed tube 40 is opened. The feed tube 40 also has an open outlet at its opposed, downstream end 42 through which pellets 25 are ejected or emitted.

The feed tube 40 includes a window 45 through which pellets 25 are fed from the hopper 21. The window 45 is a roughly semi-cylindrical portion of the feed tube 40 which is open. The window 45 has opposed ends bounding the window 45 which are coextensive to the opposed sides 35 of the throat 34. The upstream end 42 of the feed tube 40, located at one of the sides 35 of the throat 34, defines one of the ends of the window 45, with the other end located at the opposite side 35 of the throat 34. The window 45 is directed upward, toward the hopper 21. The window 45 therefore opens the feed tube 40 to its entire length within the throat 34 and to the hopper 21, joining the feed tube 40 with the hopper 21 in communication, so that pellets 25 may drop from the hopper 21 into the feed tube 40.

The feed tube 40 also includes a drop or drain 46 (best shown in FIG. 6A) at its upstream end 42. The drain 46 is an opening; it is a roughly semi-cylindrical portion of the feed tube 40 which opens downward. The drain 46 has opposed ends 50 and 51. The end 50 is located proximate to the upstream end 42 of the feed tube 40, and the downstream end 51 is located inboard of the downstream end of the window 45 proximate the side 35 of the throat 34 which is opposite the upstream end 42. The drain 46 is directed downward, toward the outlet 36 at the bottom of the grill 10. The drain 46 therefore opens the feed tube 40 to a lower portion of the throat 34 and to the outlet 36, so that pellets 25 in the feed tube 40 may drop from the hopper 21 through the outlet 36 and out of the fuel pathway 26 and out of the grill 10. The drain 46 can, however, be opened and closed to enable or disable dropping of pellets 25 out of the fuel pathway 26.

The feed tube 40 bounds the auger 41. The auger 41 includes a short shank 52, extending from an upstream end 53 to a downstream end 54. The shank 52 extends from the upstream end 42 of the feed tube 40 to approximately the downstream end 51 of the drain 46. The auger 41 also includes flighting 55 wrapping around the shank 52 and then continuing beyond the downstream end 54 of the shank 52. The flighting 55 is helical, and it extends entirely from the upstream end 42 of the feed tube 40 and beyond, terminating proximate the downstream end 43 of the feed tube 40. The feed tube 40 closely surrounds the auger 41, and the flighting 55 is in near contact with the inside surface of the feed tube 40.

Rotation of the shank 52 imparts corresponding rotation the flighting 55. The shank 52 extends into the feed tube 40 and the flighting 55 is mounted on the shank 52. The shank 52 also extends in the opposite direction, upstream from the upstream end 42 of the feed tube 40. As shown in FIG. 4, the shank 52 extends through and beyond an thick endwall 56 at the upstream end 42 to in front of the endwall 56. There, the shank 52 is connected to a motor 60 which drives rotational movement of the auger 41. The shank 52 thus defines the rotor shaft for the motor 60, and the endwall 56 acts as a bushing. This bushing endwall 56 seals the feed tube 40 at its upstream end 42, thereby protecting the motor 60 from pellets 25, dust, debris, and other elements deleterious to the operation of the motor 60.

The feed tube 40 has an upward, diagonal orientation from proximate to the hopper 21 to proximate the burn assembly 24. Preferably, but not necessarily, the angle of this orientation is thirty-degrees when the grill 10 is leveled on a surface. The upstream end 42 of the feed tube 40 is in the bottom of a housing 37 containing the hopper 21 and part of the feed assembly 22. In this low position of upstream end 42 of the feed tube 40, the hopper 21 can release its held pellets 25 into the feed tube 40. From there, the feed assembly 22 carries the pellets 25 laterally away from the hopper 21 but also vertically away from it, toward the downstream end 43. When the grill is operating, most of the pellets 25 and any other matter in the feed tube 40 are carried up and over the downstream end 43, where they are dropped into the burn assembly 24.

However, the auger 41 may not carry everything to the burn assembly 24. While the auger 41 flighting 55 is in near contact with the inside surface of the feed tube 40, there is some clearance with it, and smaller pellets, dust, and other small debris or unwanted items may fall between the auger 41 and the sidewall of the feed tube 40. The upward diagonal orientation of the feed assembly 22 causes these smaller pellets, dust, and other debris or unwanted items not picked up by the auger 41 to slide down, backward, to the upstream end 42 of the feed assembly 22. There they collect, accumulating in a pile between the endwall 56 and the sidewall of the feed tube 40.

Figure 6A:
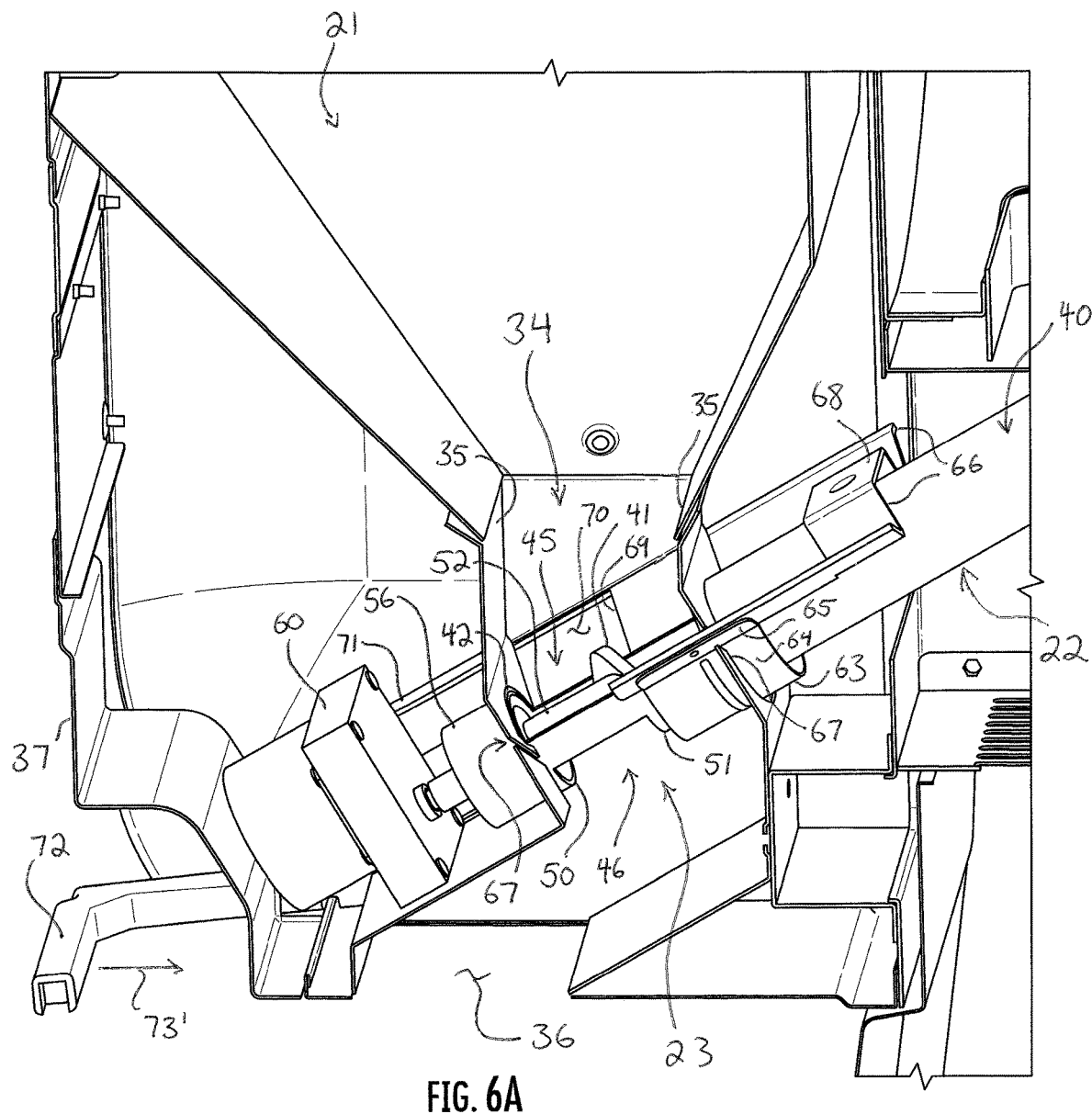
FIGS. 6A and 6B are enlarged views of FIG. 5 showing a drop assembly in first and second conditions.
Figure 6B:
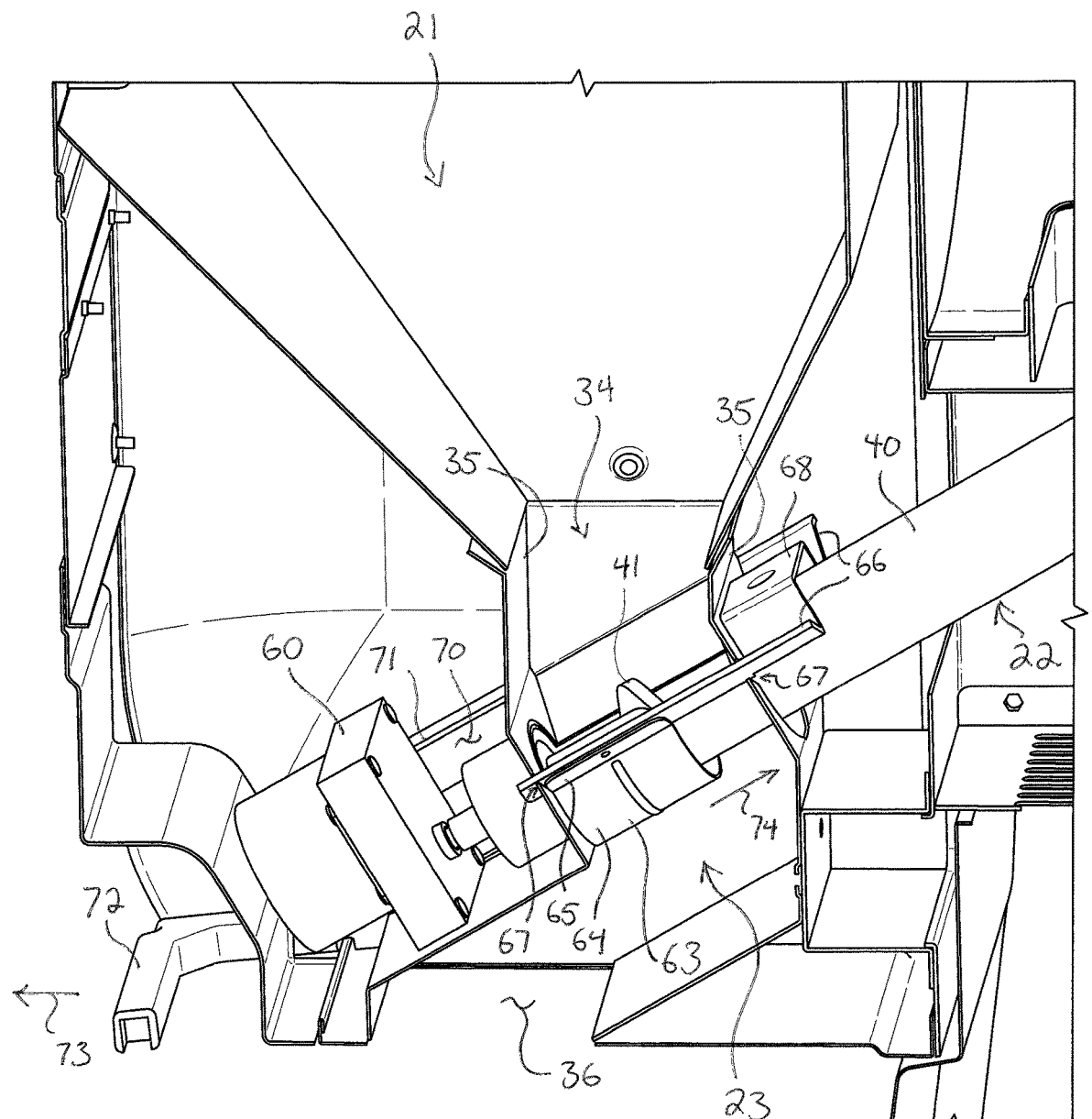
Figure 7:
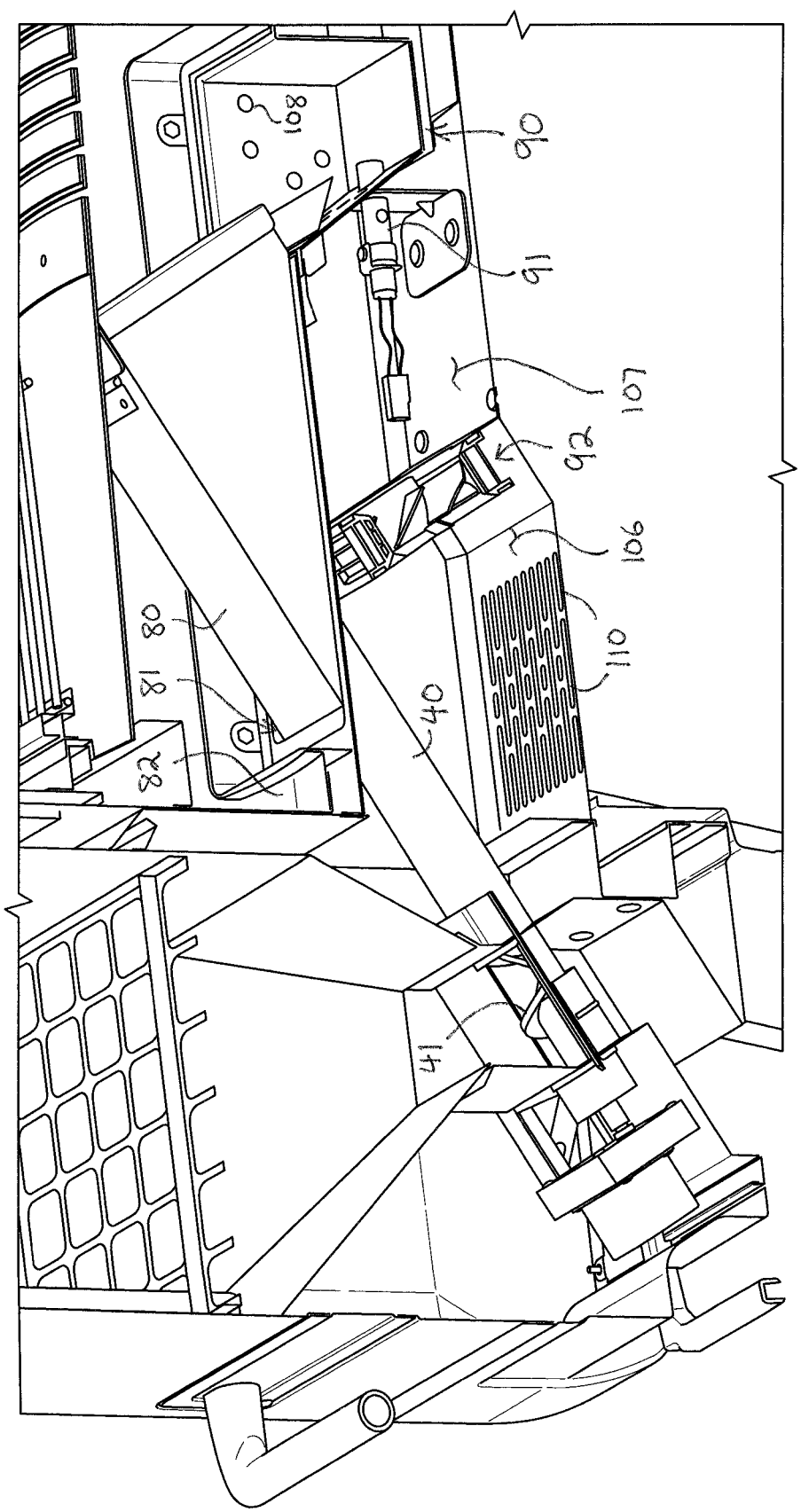
FIG. 7 is an enlarged perspective section view of the grill taken along line parallel to and just offset from the line 1-1 of FIG. 1.

With reference now primarily to FIGS. 6A and 6B, to clean the collected debris from the feed assembly 22, the user operates the drop assembly 23. The drop assembly 23 can be arranged in first and second conditions. In the first condition (FIG. 6A), pellets 25, collected debris, and the like are enabled to drop around the feed tube 40, through the auger 41, and out of the feed assembly 22. Moreover, in the first condition, pellets 25, collected debris, and the like are further enabled to drop entirely out of the grill 10, through the outlet 36. In the second condition (FIG. 6B), pellets 25, collected debris, and the like are kept in the feed tube 40, in the auger 41, and in the feed assembly 22. The drop assembly 23 is part of the fuel pathway 26.

The drop assembly 23 is lower than the hopper 21, located at the bottom end and the upstream end 42 of the feed tube 40. The drop assembly 23 includes a slidable trap 63 bounding the underside of the feed tube 40 at the drain 46 and flanges 66 flanking the feed tube 40 within the throat 34. The trap 63 is mounted over the drain 46 for preferably reciprocal movement between first and second positions along the feed tube 40. The trap 63 is lower than the hopper 21, lower than the burn pot 90, and is located at the bottom end and upstream end 42 of the feed tube 40.

The trap 63 is a sheet having a semi-cylindrical medial channel 64 and two flat, opposed, short flanges 65 extending diagonally apart from that channel 64. The channel 64 corresponds in shape to the underside of the feed tube 40 and is just larger than the drain 46 in size, such that the channel 64 covers the drain 46 when registered in position with the drain 46. The short flanges 65 extend out from the channel 64 and are attached to wide flanges 66 flanking the feed tube 40. These flanges 66 are outboard of the feed tube 40 and extend roughly radially outward therefrom. They are slightly longer than the throat 34, so that the flanges 66 project beyond both sides 35 of the throat 34 when in the second position (FIG. 6B). In FIG. 6B, the flanges 66 cooperate with the feed tube 40 to occlude the throat 34 between the hopper 21 and the outlet 36.

The trap 63 and the flanges 66 are moveable together between the first and second positions corresponding to the first and second conditions of the drop assembly 23. When the trap 63 moves, the trap 63 and flanges 66 either open or close the drain 46 and the throat 34, to either feed or drop the pellets 25 and other debris or fuel matter contained in the feed tube 40.

FIG. 6A illustrates the first condition of the drop assembly 23. There, the trap 63 is advanced in the first position, opening the throat 34 below the auger 41 and joining the drain 46 and the outlet 36 in fluid communication. The trap 63 is out of registration with the drain 46 and thus opens the drain 46 opening in the feed tube 40. The flanges 66 open the throat 34 on either side of the feed tube 40. This joins the hopper 21 in fluid communication with the throat 34 through the auger 41 and also joins the hopper 21 in fluid communication with the throat 34 around the feed tube 40. In turn, this allows pellets 25 and other fuel matter in the feed tube 40 to clear out of the fuel pathway 26, which empties the hopper 21 and dumps the pellets 25 out of the outlet 36 and out of the grill 10. It also empties any smaller pellets, dust, and other small debris or unwanted items from the fuel pathway 26.

FIG. 6B illustrates the second condition of the drop assembly 23. There, the trap 63 is retracted in the second position, occluding or closing the throat 34 at and below the auger 41. The trap 63 is registered with and closes the drain 46 opening in the feed tube 40, and the flanges 66 close the throat 34 on either side of the feed tube 40. This separates the hopper 21 from fluid communication with the throat 34 through the auger 41, and it also separates the hopper 21 from fluid communication with the throat 34 around the feed tube 40, which thereby enables movement of the pellets 25 and other fuel matter in the feed tube 40 along the fuel pathway 26.

The flanges 66 that the trap 63 is attached to are slides fit into slots 67 in the sides 35 of the throat 34 for sliding movement. The flanges 66 are connected to each other at a forward yoke 68 disposed between the flange 66 and at their front or downstream ends. From opposed sides of the yoke 68, the flanges 66 extend upstream along the feed tube 40 to rear edges 69 which are tangential to the length of the flanges 66. Only one rear edge 69 is visible in FIGS. 6A and 6B. The rear edges 69 cut inwardly, defining a hole or opening 70 upstream of each rear edge 69. A long tail 71 or slender straight portion of the flange 66 continues to extend upstream along the feed tube 40.

A pair of slots 67 are visible to the reader on the "close" side of the feed tube 40 in both FIGS. 6A and 6B; a mirrored pair of slots 67 are on the "far" side of the feed tube 40 but are not marked in these drawings. The flanges 66 are carried for sliding movement in these slots 67. In FIG. 6B, the tail 71 extends upstream of the throat 34, next to the motor 60, and the opening 70 is positioned outside of the throat 34. In the second position shown in FIG. 6B, the trap 63 and the flange 66 are retracted, and the main portion of the flange 66 is within both slots 67.

In the first position of the trap 63 and the flange 66 in FIG. 6A, the main portion of the flange 66 is in one of the slots 67, but the flange 66 is advanced such that only the tail 71 is in the other of the slots 67. Moreover, with the trap 63 and the flanges 66 advanced forward, the openings 70 are also moved into the throat 34. Thus, in the first position, not only is the drain 46 open, but the large openings 70 on either side of the feed tube 40 are also now moved into and disposed within the throat 34. This creates a large opening in the throat 34, joining the hopper 21 and the outlet 36 in open fluid communication so that gravity will cause any pellets 25 in the hopper 21 or the feed assembly 22 to drop and empty out of the grill 10.

A user can thus easily clean out the hopper 21, the feed assembly 22, or another part of the fuel pathway 26 by opening the drop assembly 23. A user operates and opens the trap 63 and flanges 66 by grabbing a handle 72 at the bottom of the housing 37 and pulling it out away from the housing 37. The handle 72 is coupled with a linkage to the tails 71 on either side of the feed tube 40. When the user desires to clear the fuel pathway 26, he grasps the handle 72 and pulls out, along the arrowed line 73 in FIG. 6B. This causes the linkage to pivot and push the trap 63 and flanges 66 of the drop assembly 23 downstream, along the arrowed line 74 in FIG. 6B. This opens the throat 34. Any pellets 25 in the hopper 21 will fall cleanly down, through the auger 41 and the drain 46 or through the openings 70 on either side of the feed tube 40. Any pellets, dust, and other debris or items in the feed tube 40 will also fall cleanly out of the drain 46. All of this matter will then fall through the throat 34 below the feed tube 40 and then out the outlet 36, clearing the fuel pathway 26 and the grill 10.

Once the fuel pathway 26 has been cleared, the user can move the handle 72 back (along the line 73'), thereby moving the trap 63 and flanges 66 back as well. The trap 63 again closes the drain 46 in the feed tube 40, and the flanges 66 again close the throat 34. The grill 10 is now ready for re-use, and pellets 25 added to the hopper 21 will be carried by the feed assembly 22 to the burn assembly 24 when the grill 10 is operating. The downstream end 43 of the feed tube 40 is open, so that pellets 25 conveyed along the feed tube 40 ultimately drop out of the downstream end 43.

As seen in FIGS. 3, 4, 5, and 7, the downstream end 43 of the feed tube 40 is disposed within a housing 80. That housing 80 passes through an opening 81 in a floor 82 of the cooking chamber 11. The housing 80 covers and protects the feed tube 40. A top end 84 of the housing 80 has a flap 83 hinged for pivotal movement to the top end 84 of the housing 80 at the downstream end 43 of the feed tube 40. The flap 83 can be lifted to access and service the feed tube 40. The flap 83 protects pellets in the feed tube 40 from the heat rising up from the burn assembly 24. The flap 83 also helps direct pellets falling out of the feed tube 40 into the burn assembly 24.

The downstream end 43 of the feed tube 40 is mounted in an end of the housing 80, defined as a slide 85. The slide 85 is smooth, straight, and oriented at an angle roughly perpendicular to the angle of the feed tube 40. The slide 85 extends between the downstream end 42 of the feed tube 40 and the burn pot 90 for conveying the pellets 25 that are ejected out of the downstream end 42. The slide 85 is below the flap 83, such that there is a small-height gap 86 along the full length of the slide 85 from the feed tube 40 between the slide 85 and the flap 83. Pellets 25 ejected from the feed tube 40 move fluidly down the slide 85 in this gap 86 into the burn assembly 24 without bumping or popping out.

The burn assembly 24 includes at least a burn pot 90, an igniter 91, and a fan 92. The burn assembly 24 is part of the fuel pathway 26, and indeed, the fuel pathway 26 moves pellets 25 from the hopper 21 to the burn pot 90 where they are held for combustion. The burn pot 90 is located just below the floor 82 and receives pellets 25 deposited from the feed assembly 22 to hold the pellets 25 during combustion thereof.

The burn pot 90 is disposed lower than the downstream end 43 of the feed tube 40. Moreover, the burn pot 90 is spaced apart from the feed tube 40 by a gap 98. The gap 98 extends both vertically and horizontally between the downstream end 43 of the feed tube 40 and the burn pot 90 and thus maintains an air break between those two features such that they are preferably not in direct contact with each other. In other embodiments, this is not the case.

The burn pot 90 receives and holds pellets 25 ejected from the feed tube 40 during combustion thereof. The burn pot 90 preferably, but not necessarily, has four sides: a front slide wall 93, opposed side walls 94, and a back wall 95. The burn pot 90 also has a floor 96. The side walls 94 and the back wall 95 of the burn pot 90 are all preferably vertical.

The slide wall 93 is the front wall of the burn pot 90. The slide wall 93 continues below the slide 85 as an extension thereof. The slide wall 93 is also straight and oriented at an angle equal to the angle of the slide 85 and roughly perpendicular to the feed tube 40. It extends from the slide 85 to the floor 96 of the burn pot 90.

There is a ramp 100 at the top of the slide wall 93. The ramp 100 projects laterally and downwardly out from the slide wall 93, below the downstream end 43 of the feed tube 40, and between the slide 85 above and the slide wall 93 below. The ramp 100 has a cantilevered body; it is preferably a thin, flat sheet of material which cantilevers out to a free end 101 that is suspended in the open interior of the burn pot 90.

The igniter 91 extends through a hole 102 in the slide wall 93. The igniter 91 is preferably mounted or suspended so that it makes no contact with the edges of the hole 102 or with any other part of the slide wall 93. In some embodiments, the igniter 91 is mounted in a sleeved housing to hold it. In yet other embodiments, the burn assembly 24 uses an induction plate instead of a hot rod. This embodiment, however, employs a hot rod-style igniter 91, which is coupled to the control unit and power supply 18 with wires 103 that pass through the housing for the fan 92. The igniter 91 provides heat to the pellets 25 for combustion.

Several holes 104 are formed through the slide wall 93 of the burn pot 90 to allow air into the burn pot 90 to help fuel the combustion therein. The air enters the burn pot 90 from a large plenum 105. The burn pot 90 is mounted within the plenum 105. The plenum 105 is bifurcated into two compartments: a first compartment 106 and an opposed second compartment 107. The fan 92 separates the first and second compartments 106 and 107, though the feed tube 40 extends through both.

The first compartment 106 is upstream, because environmental air is drawn into it through vents 110 in the bottom of the compartment 106. The spinning fan 92 creates a negative pressure in the first compartment 106 to pull air in through the vents 110 from the environment outside the grill 10 and then direct that air into the second compartment 107 and toward the burn pot 90.

The burn pot 90, disposed in the second compartment 107, is spaced apart from the walls of the second compartment 107, such that air can circulate around the burn pot 90. In some embodiments, the side and back walls 94 and 95 of the burn pot 90 have a hole or multiple holes 108 formed through them; in such embodiments, air also passes through those holes and into the burn pot 90. This provides a reliable and consistent flow of oxygen to the burn pot 90.

The fan 92 is mounted within the plenum 105 at a preferable, but not critical, angle of approximately thirty degrees, just below the feed tube 40. The fan 92 rotates about an axis 97 (shown only in FIG. 3) which is parallel to and vertically offset from the axis 47 of the feed tube 40 and auger 41. In other words, the axis of rotation about which the fan 92 spins is registered at thirty degrees, or approximately parallel to the feed tube 40. The fan 92 is mounted within a housing 111, and the housing 111 is flush against the interior walls of the housing 80, thereby substantially blocking the passage of air between the first and second compartments 106 and 107.

The burn pot 90 is mounted in the second compartment 107 for easy removal. The distal end of the second compartment 107 is open, and the burn pot 90 is applicable to the distal end to close it. The burn pot 90 is secured in a rectangular prismatic cap 112 with a handle 113 projecting laterally. The cap 112 slides over the open end of the second compartment 107 and is secured thereon with a clasp 114 (visible only in FIGS. 4 and 5). The cap 112 is freely accessible under the cooking chamber 11.

In operation, the user connects the grill 10 to an electrical outlet to provide power to the control unit and power supply 18. The user dumps pellets 25 into the hopper 21 and then sets a desired temperature for the grill 10. Pellets 25 at the bottom of the hopper 21 fall under the force of gravity from the hopper 21, through the throat 34, through the window 45, and into the feed tube 40. The igniter 91 heats up, and the drive motor 60 turns to impart rotation to the auger 41. The flighting 55 of the auger 41 carries pellets 25 up the feed tube 40 (in a downstream direction along the fuel pathway 26) where they are ejected and thus deposited onto the slide 85 and directed into the burn pot 90. The fan 92 spins, pulling air in from the environment outside the grill 10 and directing it into the burn pot 90. The pellets 25 in the burn pot 90 begin to burn. This produces heat and smoke. In some embodiments, the user can set the control unit 18 to produce more or less heat and smoke for different cooking times, temperatures, and flavors.

In FIG. 5, a horizontal divider 120 is shown within the second compartment 107. The divider 120 includes a large rectangular hole 121 above the fan 92 and below the feed tube 40. When the fan 92 is spinning, the fan 92 moves air into the second compartment 107 both above and below the divider 120. Air moving through the hole 121 in the divider 120 enters an interior space 122. The interior space 122 is separated from the gap 86 by the slide 85, but small slits are formed along the sides of the slide 85 joining the interior space 122 and the gap 86 in fluid communication. The air in the interior space 122 enters the gap 86 between the slide 85 and the flap 83 and then finally moves downward into the burn pot 90. This helps prevent burn back, or the possibility for flame or heat to burn up from the burn pot 90 and into the feed tube 40 where it could possibly ignite pellets in the feed tube 40.

Heat and smoke generated in the burn pot 90 move into the cooking chamber 11. As shown in FIG. 3, the cooking chamber 11 is divided by a drip pan 130 into an upper chamber 131 and a lower chamber 132. The heat and smoke first rise into and fill the lower chamber 132 under the drip pan 130.

Figure 8A:
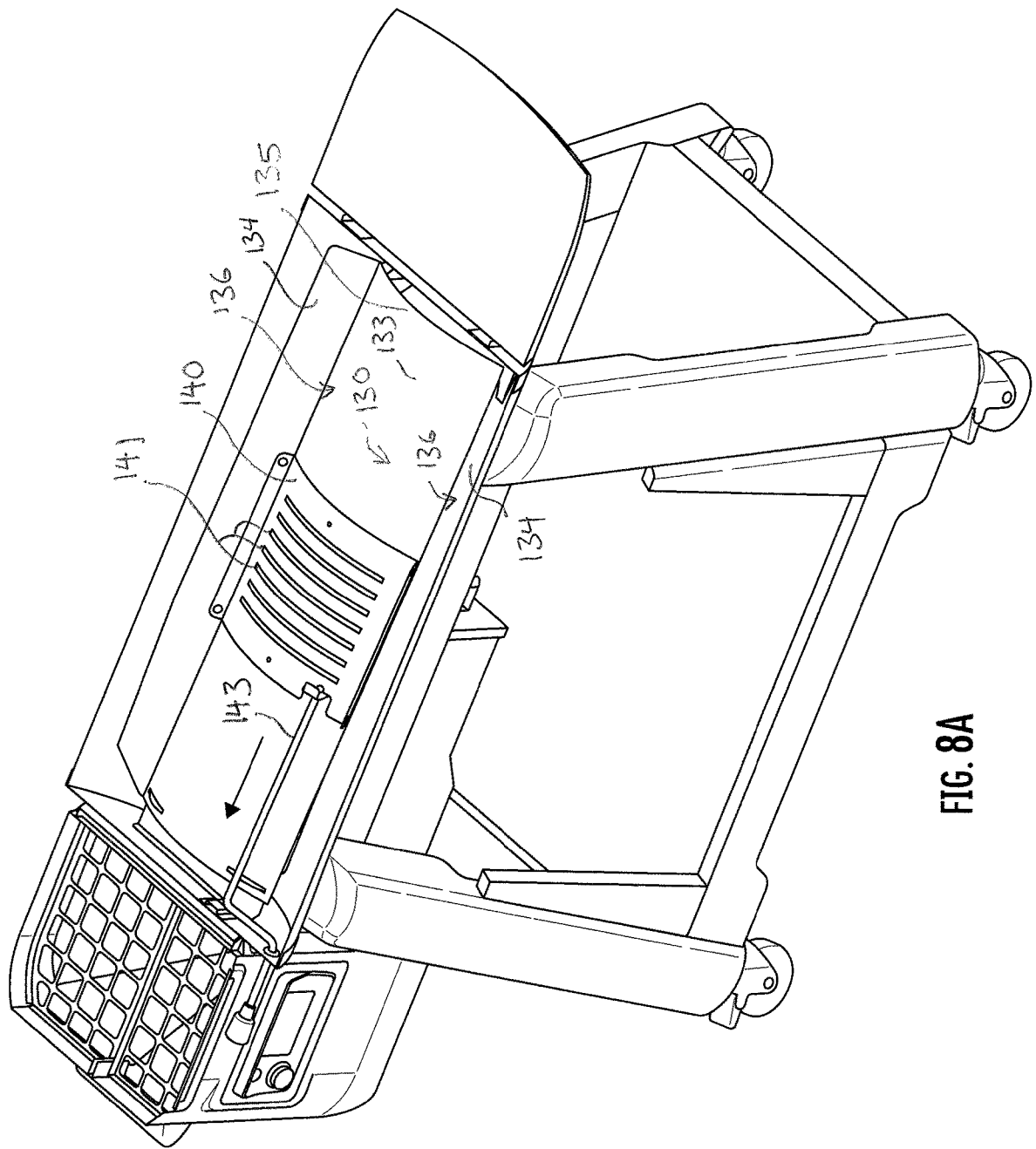
FIGS. 8A and 8B are top perspective section views of the grill of FIG. 1 taken along the line 8-8 in FIG. 1, showing different positions of a damper for the grill.
Figure 8B:
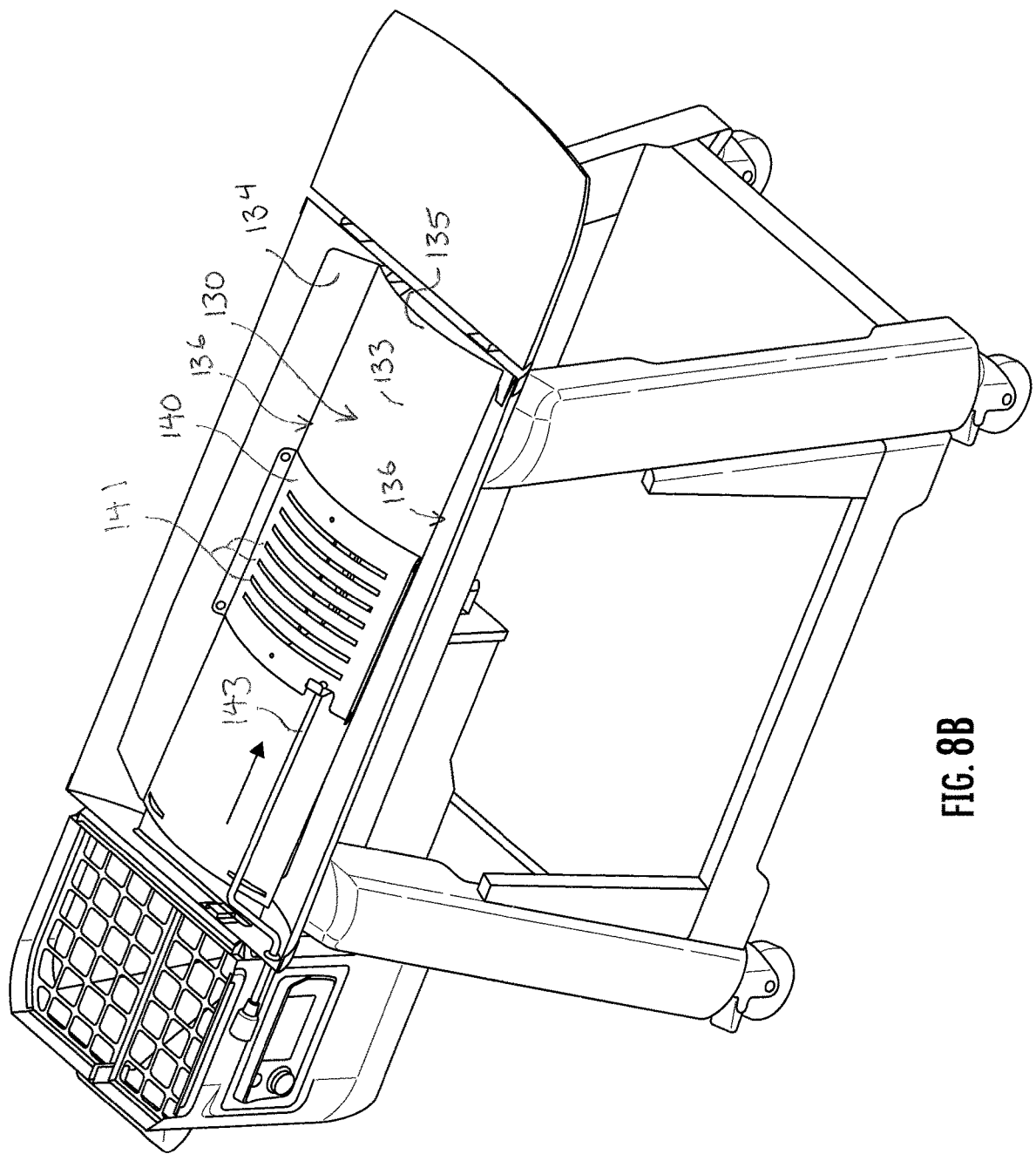
Figure 9:
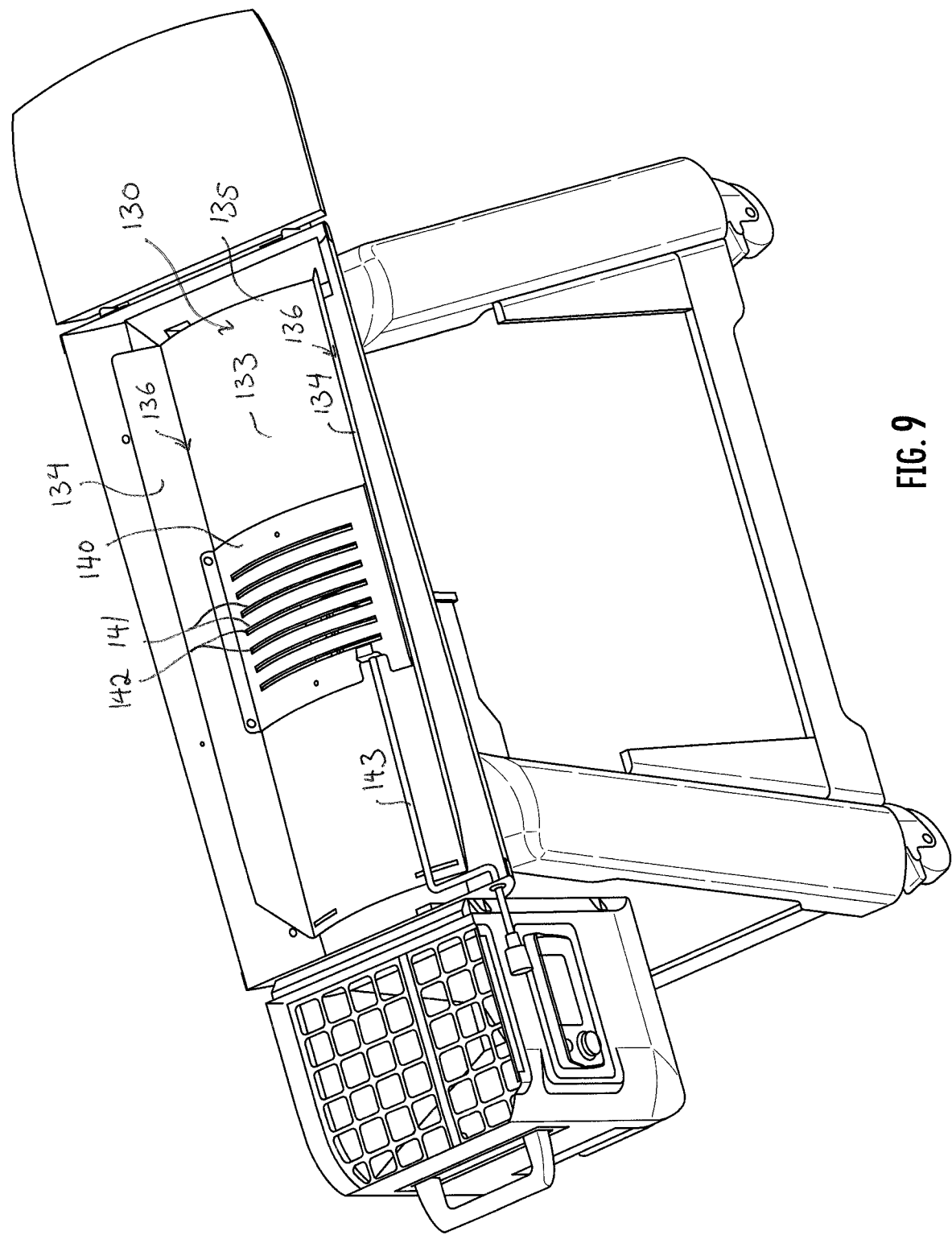
FIG. 9 is a top perspective section view of the grill of FIG. 1 taken along the line 8-8 in FIG. 1.

The drip pan 130 is shown in the section views of FIGS. 8A, 8B, and 9 (each taken along the line 8-8 in FIG. 1). The drip pan 130 includes a large, elongate, body panel 133 and side flanges 134. The body panel 133 is convex (bulging upward) and extends almost entirely from one end of the cooking chamber 11 to the other. The body panel 133 has a drip end 135 which stops just short of the inner wall of the cooking chamber 11. The flanges 134 are formed at opposed long sides of the drip pan 130 and project outwardly and upwardly. The flanges 134 thus form two drain channels 136 with the body panel 133. The drip pan 130 is angled downward to the drip end 135 (as seen in FIG. 3), so that grease and juice dripping from food on the racks 12 drips onto the drip pan 130, into the drain channels 136, and is then conveyed off the drip end 135. A drip tray 137 below the drip end 135 collects the grease and juice and funnels it to a grease trap or bucket 138 which can be cleaned periodically (as seen in FIG. 3).

The user can adjust the amount of flame, smoke, and heat that enters the upper chamber 132 of the cooking chamber 11. Vents 142 formed in the body panel 133 are covered by a damper plate 140. The damper plate 140 corresponds in curvature to the body panel 133 and thus forms a good seal with the body panel 133. The damper plate 140 is formed with a plurality of vents 141. The damper plate 140 slides along the body panel 133 between positions in which the lower vents 142 are mis-registered with the upper vents 141 (as in FIG. 8A) and one in which the lower vents 142 are registered with the upper vents 141 (as in FIG. 8B). An arm 143 extends from the damper plate 140 to the side of the grill 10. The user can adjust the arm 143 to reduce or induce direct flame to the cooking surface for higher heat.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:
1. A cooking appliance for cooking with a fuel, the cooking appliance comprising:
   a hopper configured to hold the fuel and funnel the fuel into a throat, the throat extending between the hopper and an outlet of the cooking appliance;
   a burn pot configured to receive the fuel and hold the fuel during combustion thereof;

a feed tube extending from an upstream end, proximate the hopper, to a downstream end, proximate the burn pot, wherein the feed tube is configured to move the fuel from the upstream end to the downstream end;

the upstream end of the feed tube is lower than the downstream end of the feed tube; and a drain at the upstream end of the feed tube, disposed in the throat between the hopper and the outlet, and a trap mounted for sliding, reciprocating movement out of and into the throat between a first position in which the trap opens the drain to clear the fuel from the feed tube into the throat and out the outlet, and a second position in which the trap closes the drain;

wherein the trap includes a semi-cylindrical medial channel, disposed below an underside of the feed tube, and opposed flanges extending apart from the channel;

in the first position, the channel is out of registration with the drain to open the drain and the flanges open the throat on opposed sides of the feed tube, and in the second position, the channel covers the drain and the flanges occlude the throat on the opposed sides of the feed tube.

2. The cooking appliance of claim 1, further comprising an auger mounted for rotation within the feed tube.

3. The cooking appliance of claim 1, further comprising a flap hinged for pivotal movement at the downstream end of the feed tube.

4. The cooking appliance of claim 1, wherein the burn pot is disposed lower than the downstream end of the feed tube.

5. The cooking appliance of claim 1, further comprising a slide extending between the downstream end of the feed tube and the burn pot for conveying the fuel ejected out of the downstream end into the burn pot.

6. The cooking appliance of claim 5, wherein the slide is angled.

7. The cooking appliance of claim 5, further comprising a ramp below the downstream end of the feed tube, the ramp comprising a cantilevered body with a free end suspended into the burn pot.

8. The cooking appliance of claim 1, further comprising a fan configured to draw air into the cooking appliance and direct it toward the burn pot.

9. The cooking appliance of claim 8, wherein:
the fan is below the feed tube and rotates along a fan axis; and
the feed tube extends along a feed axis which is parallel to the fan axis.

10. The cooking appliance of claim 8, further comprising:
a plenum separated by the fan into first and second compartments;
the feed tube extends through both the first and second compartments;
the burn pot is disposed in the second compartment; and
the fan draws air into the first compartment and moves the air into the second compartment.

11. A cooking appliance for cooking with a fuel, the cooking appliance comprising:
a hopper configured to hold the fuel and funnel the fuel into a throat, the throat extending between the hopper and an outlet of the cooking appliance;

a burn pot configured to receive the fuel and hold the fuel during combustion thereof, a feed tube configured to receive the fuel from the hopper at a first height, move the fuel from the hopper, and eject the fuel at a second height into the burn pot; and a drain at the upstream end of the feed tube, disposed in the throat between the hopper and the outlet, and a trap mounted for sliding, reciprocal movement out of and into the throat between a first position in which the trap opens the drain to clear the fuel from the feed tube into the throat and out the outlet, and a second position in which the trap closes the drain;

wherein the trap includes a semi-cylindrical medial channel, disposed along and shaped to correspond to an underside of the feed tube, and flanges extending apart from the channel;

in the first position, the channel is out of registration with the drain to open the drain and the flanges open the throat on opposed sides of the feed tube, and in the second position, the channel covers the drain and the flanges occlude the throat on the opposed sides of the feed tube;

wherein the second height is greater than the first height.

12. The cooking appliance of claim 11, further comprising an auger mounted for rotation within the feed tube.

13. The cooking appliance of claim 11, further comprising a flap hinged for pivotal movement at a downstream end of the feed tube.

14. The cooking appliance of claim 11, wherein the burn pot is disposed lower than a downstream end of the feed tube above the burn pot.

15. The cooking appliance of claim 11, further comprising a slide extending between the feed tube and the burn pot for conveying the fuel ejected out of the feed tube into the burn pot.

16. The cooking appliance of claim 15, wherein the slide is angled.

17. The cooking appliance of claim 15, further comprising a ramp below the feed tube, the ramp comprising a cantilevered body with a free end suspended into the burn pot.

18. The cooking appliance of claim 11, further comprising a fan configured to draw air into the cooking appliance and direct it toward the burn pot.

19. The cooking appliance of claim 18, wherein:
the fan is below the feed tube and rotates along a fan axis; and
the feed tube extends along a feed axis which is parallel to the fan axis.

20. The cooking appliance of claim 18, further comprising:
a plenum separated by the fan into first and second compartments;
the feed tube extends through both the first and second compartments;
the burn pot is disposed in the second compartment; and
the fan draws air into the first compartment and moves the air into the second compartment.

* * * * *